United States Patent [19]

Schwarcz

[11] 3,887,645
[45] June 3, 1975

[54] COPOLYMERIZATE OF UNSATURATED POLYESTER, UNSATURATED MONOMER AND CARBOXY CONTAINING MONOMER

[75] Inventor: José Schwarcz, Vicente Lopez, Argentina

[73] Assignee: S. A. Alba, Buenos Aires, Argentina

[22] Filed: Jan. 2, 1974

[21] Appl. No.: 429,797

[30] Foreign Application Priority Data
Jan. 4, 1973 Argentina .......................... 245991

[52] U.S. Cl............ 260/861; 260/29.2 E; 260/40 R; 260/75 UA
[51] Int. Cl.......................... C08f 21/00; C08f 21/02
[58] Field of Search ........................ 260/861, 292 E

[56] References Cited
UNITED STATES PATENTS

| | | | |
|---|---|---|---|
| 3,335,102 | 8/1967 | Bussell............................... | 260/861 |
| 3,619,392 | 11/1971 | Metzner............................... | 260/861 |
| 3,708,452 | 1/1973 | Tsubakimoto ....................... | 260/861 |
| 3,740,372 | 6/1973 | Baum................................... | 260/861 |
| 3,743,686 | 7/1973 | Koch................................... | 260/861 |

FOREIGN PATENTS OR APPLICATIONS

| | | | |
|---|---|---|---|
| 45-36876 | 11/1970 | Japan................................ | 260/861 |
| 248,211 | 3/1966 | U.S.S.R............................. | 260/861 |

*Primary Examiner*—Paul Lieberman

[57] ABSTRACT

This invention is drawn to a water-dilutable film forming material prepared by the reaction of an unsaturated polyester, a vinyl monomer free from functional groups and a carboxy containing monomer. The unsaturated polyester is prepared from the reaction of partially hydrogenated phthalic acids, and acylic dibasic acids with excess polyol. The reaction product contains 30–80% by weight of a vinyl monomer residue, 3–20% by weight of carboxylic acid monomer residue, and 10–67% by weight of the unsaturated polyester.

4 Claims, No Drawings

COPOLYMERIZATE OF UNSATURATED POLYESTER, UNSATURATED MONOMER AND CARBOXY CONTAINING MONOMER

The present invention refers to a film-forming material with which water-dilutable paints that are stable in an aqueous medium and cure by exposure to air at room temperature, can be formulated providing protective and decorative films on various substrates.

The present invention relates to water-dilutable film-forming materials which are suitable for use as a binder in surface coatings that are stable in an aqueous medium and cure by exposure to air at room or higher temperatures.

Most of the known air-drying, water-dilutable surface coatings fall into one of the following classes:

a. Those that contain an inorganic material such as lime or cement which is necessary for their conversion.
b. Those that contain water soluble polymeric materials, mostly natural polymers, which are insolubilized by means of some additive or catalyst.
c. Those based on polyesters of unsaturated compounds which depend on oxidation for their curing, such as drying oil-modified or allyl alcohol-etherified alkyds, which become water soluble when their acidic groups are neutralized with a base, the acidic groups being present as semiesters of dicarboxylic acids.
d. Those based on polymers or copolymers in emulsion, that dry by evaporation of the water followed by coalescence of the micelles of the emulsion.
e. A variant of (d) comprising emulsion copolymers in which the water compatibily has been enhanced by including acidic monomers, which are thereafter neutralized with a volatile base, in their composition. Evaporation of the water and the base produces an insoluble copolymer film. All such coatings suffer from some disadvantages that seriously limit their utilization. For example, the emulsion polymers of class (d), because of the very nature of their film forming process, are unsuitable for high gloss coatings.

This limitation applies to a still greater extent for coatings of class (a). The coatings of class (b) remain soluble only for a short time after addition of the catalyst. The stability of coatings of class (c) is limited due to the hydrolysis of the dicarboxylic acid semiesters in the high pH aqueous environment, the polymer thereby losing its solubility in the aqueous medium. The use of emulsions of classes (d) and (e) yields coatings with poor levelling qualities, which remain thermoplastic permanently after drying, this drawback being due to the absence of crosslinking reactions during the drying process of the linear polymer molecules of the emulsion.

We have found that it is possible to prepare new types of copolymers for water-dilutable coatings, which are stable for long periods and which, when properly formulated, furnish glossy, semiglossy or flat coatings which have excellent levelling, short set times and lose their thermoplasticity thereafter. This combination of properties places these coatings on a higher level of quality as compared to the known ones.

The now film-forming material described in this invention is a copolymer of B classes of components:

a. one or more neutral vinyl monomers,
b. one acidic vinyl monomer, and
c. an unsaturated polyester of low acid number which contains an unsaturated alicyclic dicarboxylic acid.

A very important characteristic of the copolymer is that its acidic groups, which confer water solubility through neutralization with a base, are the hydrolysis-resistant carboxyl groups provided by the acidic vinyl monomer.

The structures of the components of the copolymer are as follows:

a. The neutral vinyl monomers are of the formula $CH_2=R_1R_2$, where $R_1$ is hydrogen or a methyl group and $R_2$ is a phenyl group or a $COOR_3$ group, where $R_3$ is an alkyl group with a straight or branched chain of 1 to 8 atoms. Non-exclusive examples of these monomers are: styrene, ethyl acrylate, n-butyl acrylate, methyl methacrylate and 2-ethylhexyl metacrylate.
b. The acidic vinyl monomers are of the formula $R_4HC=CR_1COOH$, where $R_4$ is hydrogen or a carboxyl group, and $R1$ has the same meaning as before; they may be present in the form of the free acids or as their anhydrides. Examples of acidic vinyl monomers which may be employed are: acrylic acid, methacrylic acid, maleic acid or its anhydride, and fumaric acid.
c. The unsaturated polyester contains residues of an unsaturated alicyclic dibasic acid (or its anhydride) derived from phthalic acid by partial hydrogenation, of an $\alpha\beta$-unsaturated acyclic dibasic acid (or its anhydride) and of one or more alcohols with one or more hydroxyl groups which are present in an excess over the amount required to esterify all the carboxyl groups. The unsaturated alicyclic acids are between 80 and 100% by weight of the total acids and the $\alpha\beta$-unsaturated acids, from 0 to 20% by weight of the total acids. The molar ratio of the hydroxyl groups provided by the alcohol or alcohols to the carboxyl groups provided by the dibasic acids or anhydrides of the unsaturated polyester should be in the range between 1.05 and 1.4. The following are examples of unsaturated alicyclic dibasic acids and anhydrides: $\Delta$4-cyclohexene-dicarboxylic anhydride-1,2; $\Delta$2-cyclohexene-dicarboxylic anhydride-1,2; $\Delta$1-cyclohexene-dicarboxylic anhydride-1,2; $\Delta$3,5-cyclohexadiene-dicarboxylic acid-1,2 and $\Delta$2,6-cyclohexadiene-dicarboxylic acid-1,2. Suitable acyclic unsaturated dibasic acids or anhydrides are: maleic and fumaric acids. The alcohols with one or more hydroxyl groups comprise those usually employed in alkyd resins, such as ethylene glycol, propylene glycol, glycerol, trimethylolethane, trimethylopropane, pentaerithritol, butanol, etc.

The unsaturated polyester may be prepared by any of the conventional processes which are employed for alkyd resins.

The copolymer is composed of 30–80% by weight of neutral vinyl monomers (Class a), 3–20% by weight of acidic vinyl monomer (class b) and 10–67% by weight of unsaturated polyester (class c).

The copolymer is prepared by free radical copolymerization of components (a), (b) and (c) as explained further on; its solubilization in water is achieved by partial neutralization of its carboxyl groups with an aqueous solution of a base. The amount of base necessary for the solubilization of the copolymer should bring the pH of the mixture between the values 7.5 and 10. The base may be an inorganic compound, such as sodium or potassium hydroxide, ammonia, organic amines such as triethylamine, monoethanolamine, triethanolamine, N-dimethyl-monoethanolamine, morpholine, etc., or a mixture of these. When one of the components of a copolymer is an unsaturated polyester with a plurality of double bonds, development of early cross-linking or too high molecular weights are to be expected in general in the course of the copolymerization reaction, which would make the product unsuitable for coatings. A conventional way of avoiding these unwanted results is by the use of chain transfer agents, such as mercaptans. In the case of an air drying copolymer, however, it is not advisable to resort to such agents, since if effective, they would interfere in several ways with the air drying method.

We have found that, when the components $(a)$, $(b)$ and $(c)$ are copolymerized using free radical initiators, and preferably in aqueous suspension at temperatures between 20° and 100°C, products are obtained which unexpectedly are not cross-linked, have moderate molecular weights, and which, in addition, show perfect compatibility among their components. The copolymerization may be carried out optionally in the presence of solvents which increase the compatibility of the polymer with water, such as the monobutyl ether of ethylene glycol, the monoethyl ether of ethylene glycol, or even of a proportion of water insoluble solvents, such as toluol, xylene etc. The film forming material thus obtained may be used to prepare surface coatings employing the conventional techniques of the paint industry.

To facilitate the application of the product, its consistency may be adjusted with solvents that are compatible both with water and the copolymer (such as the monoethyl ether of ethylene glycol, the monobutyl ether of ethylene glycol, isopropyl alcohol, acetone, etc.) or even with water alone. With the admixture of driers, films which have quick touch-drying and exhibit throughcure at room or oven temperatures are produced. However, the films can be cured in the oven without requiring the addition of driers or of any thermo-setting materials.

This binder may be used without the incorporation of fillers and pigments to produce clear films; or the usual components of paints may be incorporated to produce opaque, glossy, semiglossy or flat films having special protective or decorative effects, according to the current practice in the paint industry.

The organic polymeric material prepared as described is a film former endowed with rapid drying properties which are developed by the addition of the conventional driers and is stable in aqueous solutions for a long time. To the known advantages of water dilutable vehicles it adds the possibility of producing high gloss paints which lose their thermoplasticity and their sensitivity to solvents in a short time, which possess excellent levelling properties, which do not give off unpleasant odors while drying, can be made non yellowing and do not depend on hydrolysable groups for their solubility.

In order that the invention may be well understood the following examples are given by way of illustration only:

EXAMPLE 1

Unsaturated Polyester

In a 3-necked, 5-liter flask fitted with a thermometer, reflux condenser, stirrer and a water trap (to collect the water formed in the reaction), the following compounds were charged:

| | |
|---|---|
| Δ4-cyclohexene-dicarboxylic anhydride-1,2 | 1,520 g. (10 moles) |
| Ethylene glycol | 620 g. (10 moles) |
| Glycerine | 138 g. (1,5 moles) |
| Xylene | 100 g. |

The trap was filled with xylene and the mixture heated with stirring, at 170–180°C; the acid value (AV) of the polyester was determined at intervals of half an hour. The acid value AV, (expressed as milligrams of potassium hydroxide used up in the neutralization of 1 gram of polyester) is related with the amount E (in grams) of ethylene glycol that has distilled over with the water and retained in the trap, by the formula $$E = \frac{W-L}{1000} \times \frac{34}{56} \times AV$$

where W is the total weight in grams of dicarboxylic acids plus alcohol charged into the flask and L is the weight in grams of xylene insoluble liquid that has accumulated up to that moment in the trap.

After the AV had reached a value between 90 and 120 mg/g, E grams of ethylene glycol were added to the flask to compensate for the loss, and the heating was continued until an AV under 10 was reached.

Heating was discontinued and 840 g. of ethylene glycol monobutyl ether were added. The resulting solution had approximately 70% solids by weight; a viscosity of E-I in the Gardner scale, and a color of 3 in the Gardner-Hellige scale.

EXAMPLE 2

Unsaturated Polyester

In the same equipment used for the previous example, the following compounds were charged:

| | | |
|---|---|---|
| 3,5-cyclohexadiene-dicarboxylic acid-1,2 | 1,510 g. | (9 moles) |
| Maleic anhydride | 98 g. | (1 mol) |
| Ethylene glycol | 640 g. | (10.3 mol) |
| n-Butanol | 148 g. | (2 moles) |
| Toluene | 400 g. | |
| Sulphuric acid, 96% | 10 g. | |

The trap was filled with toluene and the stirred mixture heated to 120°–128°C until the polyester reached an acid value of 19, which took place after 14 hours of heating. The acidity due to the sulphuric acid was neutralized by adding 20 g. of sodium bicarbonate and the stirring was continued for a few minutes more; then 480 grams of ethylene glycol monobutyl ether were added, the hot solution was filtered and the non volatile content was adjusted to 70% by weight with the same solvent.

The resulting solution had a viscosity of G-H in the Gardner scale, its color was 9 in the Gardner-Hellige scale and the acid value of the polyester was 15 milligrams of potassium hydroxide per gram of non volatiles.

EXAMPLE 3

Suspension Copolymerization 228 grams of water were charged into a 1 liter flask provided with reflux condenser, stirrer, thermometer and a dropping funnel, and heated to 85°C. A mixture of

| | |
|---|---|
| Methacrylic acid | 17 grams |
| Methyl methacrylate (inhibitor-free) | 63 grams |
| Ethyl acrylate (inhibitor-free) | 63 grams |
| Polyester of Example 1 (as a 70% by weight solution) | 137 grams |
| Ethylene glycol monobutyl ether | 63 grams |
| Benzoyl peroxide | 3.6 grams | was charged into the dropping funnel and added to the flask gradually, with stirring, in the course of 1 hour, while maintaining the temperature at 85°C. When the addition was finished the temperature was increased to 88°–90°C and kept in this range for 4 hours. A solution of 10 grams of triethylamine in 228 grams of water was then added through the dropping funnel; the stirring was continued for 1 hour while the temperature was kept at 80°C. A solution of the copolymer was obtained which contained 30.3% non-volatiles by weight with a pH value of 8.5 and a viscosity of 75 Krebs units (as measured in a Stormer viscometer according to ASTM method D 562—55).

EXAMPLE 4

Suspension Copolymerization

The preparation was as described in Example 3, except that inhibitor free styrene was used instead of methyl methacrylate, and in the same amount. The solution that was obtained had a pH value of 8.5 and a viscosity of 60 Krebs units.

EXAMPLE 5

Suspension Copolymerisation

The procedure was as in Example 3, except that the polyester of example 2 was used instead of that of Example 1 and that 15 grams of triethylamine were added, instead of 10 grams as in Example 3. The resulting copolymer solution had a pH value of 8.7 and its viscosity was of 54 Krebs units.

EXAMPLE 6

Unsaturated Polyester

An unsaturated polyester with essentially 100% of non-volatile was prepared as in Example 1, except that, when an acid value of 10 was reached the the temperature was lowered to 80°C, the reflux condenser and trap were removed and replaced by an inclined condenser provided with a receiving flask and connected to a water aspirator. The solvent was destilled under a pressure of 20 mm. Hg.

EXAMPLE 7

Emulsion Copolymerisation

Using the same equipment as in Example 3, the following compounds were charged into the flask:

| | |
|---|---|
| Water | 280 g. |
| Sodium lauryl sulphate as an aqueous solution of 40% by weight | 8.3 g. |
| Triton X–200 (the sodium salt of an alkyl aryl sulphonic acid-ethylene oxide condensate of Rohm and Haas Company, U. S. A.) | 6.7 g. | and the following were charged into the dropping funnel:

| | |
|---|---|
| Methacrylic acid | 24 g. |
| Methyl methacrylate (inhibitor-free) | 89 g. |
| Ethyl acrylate (inhibitor-free) | 89 g. |
| Unsaturated polyester of Example 6 | 133 g. |

The liquid in the flask was heated to 80°C in a water bath, 50 g. of a 2% weight by weight aqueous solution of sodium persulphate were rapidly added with stirring to the mixture in the flask, and then without interruption, 10 to 15% of the content of the dropping funnel was also added to it. The temperature of the flask was raised to 85°C, and the liquid remaining in the dropping funnel was slowly delivered to the flask in an interval of 2 hours while mantaining a good stirring and a temperature of 85°C during the whole period. Then, 16.5 g. more of the 2% aqueous sodium persulphate solution was added to the flask, and the mixture was stirred and heated between 85° and 87°C for 1 hour. At the end, a mixture of:

| | |
|---|---|
| Monobutyl ether of ethylene glycol | 145 g. |
| Triethylamine | 14 g. |
| Water | 280 g. | was added, and thus, a solution of a copolymer of 30.2% by weight was obtained, its pH value being 8.3 and its viscosity of 87 Krebs units.

EXAMPLE 8

Air-drying Water-dilutable Gloss Enamel

A. A pigment dispersion was prepared as follows:

In a 4 lt. bucket, 760 g. of ethyleneglycol, 330 g. of water, 25 g. of Tamol 731 (the sodium salt of a diisobutylene-maleic anhydride copolymer manufactured by Rohm and Haas Co. of U.S.A.) and 24 g. of Foamaster C (an antifoaming agent manufactured by Diamond Shamrock Chemical Co. of U.S.A.) were charged.

The mixture was agitated with a high velocity stirrer, while 2240 g. of Tipaque R-630 (a rutile titanium dioxide manufactured by Ishihara Sangyo Kaisha of Japan) was added to it. The stirring was mantained for 15 or 20 minutes more, in order to achieve a fine dispersion, which was then transferred to a porcelain ball mill and ground for 4 hours, until a fineness value of 0, as measured according to ASTM D 1210–64 standard was obtained. The dispersion had a thixotropic consistency.

B. Let down.

In a 4 lt. bucket 720 g. of the pigment dispersion A and 3.2 g. of Foamaster G were charged and 2800 g. of the copolymer solution of Example 4 was added with high velocity stirring. Then, 64 g. of Alkopal N 100 (a nonionic dispersant having the composition of an alkyl phenol-ethylene oxide 1:8 molar adduct, manufactured by Farbwerke Hoechst, West Germany) and 180 g. of a 60% by weight solution of cobalt naphthenate (containing 1.6 g. metallic Co) in monobutyl ether of ethylene glycol were added. The stirring was continued for 40 minutes, after which the mixture was allowed to stand until the foam dissapeared. The consistency was adjusted to 72–74 Krebs units by diluting with the necessary amount of water.

Films of the enamel thus obtained were formed by spreading it:

1. Over a glass plate, by means of a doctor blade with a gap of 0.15 mm. After drying at room temperature for 7 days a film of a hardness of 29 in the Sward scale (referred to a hardness of 100 for glass), and a gloss of 85, as determined with the Gardner Glossmeter at 60° reflectancy and of 63 at 20° reflectancy, were obtained.
2. By brushing over a steel plate which had a coat of a zinc chromate anticorrosive primer. The gloss of the film was of 85 at 60° and of 43 at 20°, respectively.

EXAMPLE 9

Air-drying Water-dilutable Gloss Enamel

The technique for the preparation of this enamel, as well as of those of examples 10, 11 and 12 was the same as employed in example 8. Its composition, however, was different; the following raw materials were used:

| | |
|---|---|
| A. For the pigment dispersion: | |
| Rutile Titanium dioxide Tipaque R-630 | 2,240 g. |
| Ethylene glycol | 360 g. |
| Propylene glycol | 200 g. |
| Tamol 731 | 25 g. |
| Water | 335 g. |
| Foamaster C | 24 g. |
| B. For the let down: | |
| Copolymer of example 5 | 1,400 g. |
| Pigment dispersion A of this example (N° 9) | 560 g. |
| Alkopal N 100 | 32 g. |
| Cobalt naphthenate solution in monobutyl ether of ethylene glycol, containing 2.5% by weight of metallic cobalt | 20 g. |

An enamel with a consistency of 69 Krebs units was thus obtained. When spread over a glass plate by means of a 0.15 mm. doctor blade, after drying for 7 days at room temperature, it produced a film with a Sward hardness of 29 the hardness of glass being 100 and with a gloss of 89 as determined with a Gardner Glossmeter at a reflectancy of 60°.

EXAMPLE 10

Air-drying Water-dilutable Semi-gloss Enamel

The following materials were used:

| | |
|---|---|
| A. For the pigment dispersion: | |
| Rutile titanium dioxide Tipaque R-630 | 1,216 g. |
| Barytes (Mesh-450, according to ASTM E-11-61) | 1,024 g. |
| Ethyleneglycol | 360 g. |
| Propyleneglycol | 200 g. |
| Sodium tripolyphosphate as a 5% by weight aqueous solution | 160 g. |
| Water | 100 g. |
| Tamol 731 | 100 g. |
| Foamaster G | 24 g. |
| B. For the let down: | |
| Copolymer of example 4 | 1,400 g. |
| Pigment dispersion A of this example | 560 g. |
| Alkopal N-100 | 32 g. |
| Cobalt naphthenate solution in monobutyl ether of ethylenglycol, containing 2.5% by weight metallic cobalt | 20 g. |
| Water | 40 g. |

An enamel with a consistency of 71 Krebs units was thus obtained. When spread over a glass plate by means of a 0.15 mm. doctor blade, after drying for 7 days at room temperature, it produced a film with a Sward hardness of 23 (the hardness of glass being 100) and with a gloss of 75 as determined with a Gardner Glossmeter at a reflectancy of 60°.

EXAMPLE 11

Air-drying Water-dilutable Flat Enamel

The following raw materials were used:

| | |
|---|---|
| Titanium dioxide Finntitan RDE-2 (manufactured by Vuorikomia, Finnland) | 732 g. |
| Calcium carbonate (Mesh 300) | 1,280 g. |
| White talc (Mesh 300) | 240 g. |
| Bentenite | 40 g. |
| Ethyleneglycol | 360 g. |
| Propyleneglycol | 200 g. |
| Water | 100 g. |
| Sodium tripolyphosphate as a 5% by weight aqueous solution | 160 g. |
| Temol 731 | 100 g. |
| Foamaster G | 24 g. |

B. For the let down.

The raw materials of example 10 were employed except that the pigment dispersion A of this example was used.

An enamel with a consistency of 70 Krebs units was thus obtained. When spread over a glass plate by means of a 0.15 mm. doctor blade, after drying for 7 days at room temperature, it produced a film with a Sward hardness of 23 (the hardness of glass being 100) and with a gloss of 15 as determined with a Gardner Glossmeter at a reflectancy of 60°.

EXAMPLE 12

Oven-drying, Water-dilutable Gloss Enamel

The raw materials of example 8 were used in the same quantities as in that example, except that the solution of cobalt naphthenate was absent in this formulation.

The enamel was spread on a glass plate by means of a doctor blade of 0.15 mm. and dried at room temperature for 24 hs, giving a film with a Sward hardness of 14. The same film was then oven-dried for 30 minutes at 140°C, thus increasing its hardness up to a value of 20 in the Sward scale. The gloss of the film was of 84 as determined with a Gardner Glossmeter at a reflectancy of 60°. The same film was then given an overbake for 30 minutes at 160°C, thus increasing its Sward hardness to 24, and giving the same value of gloss as before.

After both baking schedules, only a very slight yellowing of the observed.

I claim:

1. A water-dilutable film-forming material that is a copolymer formed by the addition polymerization of (a) at least one neutral vinyl monomer of the formula $CH_2=CR_1R_2$, where $R_1$ is hydrogen or a methyl group and $R_2$ is a phenyl or a $COOR_3$ residue, where $R_3$ is a straight or branched chain alkyl group with 1 to 8 carbon atoms; (b) at least one acidic vinyl monomer of formula $R_4CH=CR_1COOH$, where $R_1$ is hydrogen or a methyl group and $R_4$ is hydrogen or a carboxyl group (or its internal anhydride) and (c) an unsaturated alicyclic dibasic acid (or its anhydride) of the class of the partially hydrogenated phthalic acids, and $\alpha,\beta$-unsaturated acyclic dibasic acid (or its anhydride) and at least one alcohol with one or more esterifiable hydroxyl groups and in which the alicylic unsaturated acid comprises from 80 to 100% by weight, and the acyclic $\alpha,\beta$-unsaturated acid from 0 to 20% by weight of the total dibasic acids and the molar ratio of the hydroxyl groups provided by the alcohols to the carboxyl groups provided by the dibasic acids (or their anhydrides) has a value between 1.05 and 1.4, the copolymer containing between 30 and 80% by weight of a), between 3 and 20% by weight of (b) and between 10 and 67% by weight of (c), the copolymerization of (a), (b) and (c) being effected by free radicals and the copolymer being solubilized in water through partial neutralization of its free carboxyl groups with a base dissolved in water up to a pH value between about 7.5 and 10.

2. A film-forming material according to claim 1 in which the unsaturated alicyclic dibasic acid is one of the isomers of tetrahydrophthalic acid or its anhydride.

3. A film-forming material according to claim 1 in which the unsaturated alicyclic dibasic acid is one of the isomers of dihydrophthalic acid and the $\alpha$-$\beta$-unsaturated acyclic dibasic acid is maleic acid or its anhydride.

4. A film-forming material according to claim 1 in which the copolymerization of (a), (b) and (c) is effected in suspension in water and in the presence of a solvent for (c).

* * * * *

UNITED STATES PATENT OFFICE
CERTIFICATE OF CORRECTION

Patent No. 3,887,645  Dated June 3, 1975

Inventor(s) Jose Schwarcz

It is certified that error appears in the above-identified patent and that said Letters Patent are hereby corrected as shown below:

Column 1, line 65, the word "now" should read -- new --;

Column 1, line 66, the letter "B" should read -- 3 --; Column 2, line 12, the formula "$CH_2=R_1R_2$" should read -- $-CH_2=CR_1R_2$ --;

Column 5, line 56, after the word "the" delete the word -- the --;

Column 5, line 65, the word "Copolymerisation" should read -- Copolymerization --; Column 6, line 45, the phrase "Foamaster C" should read as -- Foamaster G --; Column 6, line 63, the numeral "180 g." should read -- 108 g. --; Column 7, line 30, the phase "Foamaster C" should read -- Foamaster G --; Column 8, line 18, the phrase "Temol 731" should read -- Tamol 731 --.

Signed and Sealed this eighteenth Day of November 1975

[SEAL]

Attest:

RUTH C. MASON
*Attesting Officer*

C. MARSHALL DANN
*Commissioner of Patents and Trademarks*